United States Patent Office 3,515,642
Patented June 2, 1970

3,515,642
METHOD FOR PREPARING A STABILIZED ENZYME COMPOSITION
Hiroyuki Mima, Nishinomiya, and Seizo Hisada, Takarazuka, Japan, assignors to Takeda Chemical Industries, Ltd., Osaka, Japan
No Drawing. Filed Dec. 6, 1966, Ser. No. 599,401
Claims priority, application Japan, Dec. 6, 1965, 40/74,949
Int. Cl. A61k 19/00
U.S. Cl. 195—63          6 Claims

ABSTRACT OF THE DISCLOSURE

The initial enzyme preparation is statbilized against loss of enzyme activity, upon being subjected to pressure-consolidation, etc., by the expedient of incorporating into the composition a stabilizing amount of sorbitol, whereby a solid product, e.g. in tablet form, is obtained with substantially full enzyme activity.

---

The present invention realtes to stabilized solid enzyme composition which consist essentially of intimate admixture of enzyme—more especially digestive enzyme—and sorbitol, the latter in an amount effective to stabilize the composition against loss of enzyme activity when subjected to pressure-consolidation or other influences, such as heat and moisture, which tend to impair the enzyme activity. The invention further relates to the manufacture of such stabilized solid enzyme compositions.

Many kinds of enzymes, e.g. amylase, protease, lipase, etc., are utilized in the food industries, in the pharmaceutical industry, in home-cooking, etc., and almost all of these enzyme preparations have been in the form of powder, since the enzymes are very unstable against water, heat, pressure, and so on, so that conversion into other forms such as tablets, granules or pills is impractical because of impairment of enzyme activity. However, such solid enzyme preparations as tablets, granules or pills are desirable especially for pharmaceutical use, because they are convenient in dispensing, in application of enteric coating, in administering, in shipping, and also in preventing incompatibility with other incorporated medicines.

On the other hand, as indicated, it is known that the activity of an enzyme is remarkably reduced in the tableting (compressed tablet-making) process, in the granulating process and in the pilling (pill-making) process. For example, the enzyme activity of commercially available diastase is, generally, reduced to 60–70% of initial activity by a punch pressure of 2 tons/cm.$^2$ in a direct compressing tablet process and by the engendered heat. Similarly, the necessity of admixing the enzyme preparation with water, kneading the wet mass, and subjecting it to the further usual granulation treatments also seriously reduces the enzyme activity relative to the initial activity. This also applies generally to the formation of pills in the pilling process.

It is an object of the present invention to provide a novel and stable solid enzyme composition, and especially such a composition which is stable to heat and pressure involved in pressure-consolidation such as that entailed in the production e.g. of enzyme-containing tablets.

Another object of this invention is to provide a method for preparing the novel and stable solid enzyme compositions without substantial loss of enzyme activity.

A further object is to provide a method for preparing the aforesaid novel and stable solid enzyme compositions.

Other objects will become apparent from the detailed description hereinafter provided.

These objects are realized according to the present invention by the expedient of incorporating into the enzyme composition a stabilizing agent, namely, sorbitol, whereby the preparation may be subjected to the various aforesaid activity-impairing influences without suffering substantial loss of enzyme activity. The resultant stabilized solid composition is, moreover, very stable during storage for a long period of time.

In the present invention, the enzyme contained e.g. in conventional enzyme compositions is stabilized against tableting, granulating or pilling processes by the use of an effective amount of sorbitol which is associated with the enzyme. For the purpose of associating the sorbitol with the enzyme, the latter—e.g. in the form of the enzyme composition—is dissolved or suspended in an aqueous solution of the sorbitol, followed by converting the resultant aqueous soultion or suspension into powder form by freeze-drying (lyophilization), spray drying, or by precipitating the enzyme preparation-sorbitol mixture by the addition of e.g. ethanol or other organic hydrophilic solvent to the aqueous solution or suspension, etc. Tablets, granules or pills may be manufactured from the thus-obtained stable enzyme powder preparation without incurring substantial reduction of enzyme activity. Alternatively, the sorbitol or an aqueous solution thereof may be added to an aqueous solution of the enzyme preparation, followed by conversion into powder form in the precedingly described manner.

Further, non-treated enzyme powder may be kneaded with an aqueous solution of sorbitol, followed by tableting, granulating or pilling. In these processes, the aqueous solution may contain water-miscible organic solvent such as methanol, ethanol, isopropanol, butanol and so on. As the aqueous solution of enzyme, it is desirable to employ the commercial enzyme preparation in a relatively high state of refinment and, from the standpoint of conversion into powder form, in saturated or substantially saturated state, i.e. with as high an enzyme concentration as possible, although lower concentrations may be employed. An aqueous suspension of enzyme is also employable for the same purpose in the present invention. Although it is more efficient that a high enzyme concentration be present in the initial enzyme preparation employed for the purposes of this invention, the concentration of the enzyme is in fact optional and may vary within exceedingly wide limits from very low concentration up to even substantially pure enzyme. In other words, the concentration of the enzyme is per se not critical; whatever the concentration, its initial enzyme activity is retained substantially unimpaired in the final product according to the invention wherein it is sorbitol-associated. The sorbitol is used in the range of 0.1 to 50 weight percent of the initial enzyme preparation and 1 to 15 weight percent of the latter is most desirable, since the problem of hygroscopicity in the solid product of this invention is thereby avoided.

The enzymes stabilized by the present invention comprise e.g. amylase, protease, lipase, invertase, papain, trypsin, pepsin, pancreatine, etc. Although these are all digestive enzymes, the invention is also applicable to other types of enzyme. The sorbitol-containing compositions obtained in the solid state according to the invention, and more especially in the form of pressure-consolidated tablets or the like, can be used for any purpose for which the initial enzyme preparation is used and in the same manner.

The solid enzyme compositions of the present invention can be formed according to conventional tableting, granulating or pilling procedures and conventional diluents such as calcium phosphate, lactose, dextrin, etc. can be employed. Furthermore, solid enzyme compositions thus prepared on can be subjected to a conventional coating process.

The solid enzyme compositions of the present invention have substantially the same enzyme activity as the starting enzyme powder or solution and can maintain such enzyme activity stable for a long period of time.

It is to be understood that the following examples of presently preferred embodiments are solely for the purpose of illustration and not to be construed as limitations of this invention, and that minor variations may be resorted to without departing from the spirit and scope of this invention. Temperatures are all uncorrected, and percentages are all on the weight basis. Parts by weight bear the same relation to parts by volume as do grams to milliliters.

Example 1

(1) *Enzyme.*—An enzyme preparation consisting of one part of crystalline enzyme (a mixture of amylase and protease) and 8 parts of calcium phosphate (commercially available e.g. in Japan, as "Biotamilase strong").

(2) *Compressed tablets—Control.*—Aqueous suspension of 20 weight parts of enzyme preparation (1) in 25 volume parts of water—the enzyme proper being in solution—is freeze-dried to give powder. Compressed tablets are formed with the freeze-dried powder under several different punch pressures of the oil pressure tablet machine.

*Sample 1.*—Aqueous suspension of 20 weight parts of enzyme preparation (1) and one weight part of sorbitol in 25 volume parts of water is freeze-dried and tableted in the same manner as employed for preparing the control.

*Sample 2.*—Aqueous suspension of 20 weight parts of enzyme preparation (1) and 6.6 weight parts of sorbitol in 25 volume parts of water is freeze-dried and tableted in the same manner as employed for preparing the control.

(3) *Methods.*—Protease activity of each of control and samples is assayed by the method of Kunitz (Journal of General Physiology vol. 30, page 291 (1947)). Amylase activity is assayed by the method of Wohlgemuth (Biochemische Zeitschrift vol. 9, page 1 (1903)). The enzyme activity is shown by percentage relative to the enzyme activity of the freeze-dried powder.

(4) *Results.*—

| | Enzyme activity, percent | | | | | |
|---|---|---|---|---|---|---|
| | Protease | | | Amylase | | |
| | Punch pressure of tablet machine (ton/cm.²) | | | | | |
| Group | 1 | 2 | 3 | 1 | 2 | 3 |
| Control | 86.2 | 78.8 | 74.6 | 83.9 | 72.5 | 68.2 |
| Sample 1 | 100.8 | 102.2 | 107.8 | 103.1 | 102.9 | 103.1 |
| Sample 2 | 98.2 | 98.3 | 101.2 | 93.6 | 94.3 | 98.8 |

Example 2

(1) *Enzyme and methods.*—The same as in Example 1.

(2) *Compressed tablets—Control.*—The same as in Example 1.

*Sample.*—A freeze-dried powder in sample 1 of Example 1 is tableted with 10% of magnesium meta-silica alumic acid (cf. New and Standard Pharmaceutical Lexicon, vol. 2, p. 1562), as carrier, antacid and tablet lubricant, in the same manner as in Example 1.

(3) *Results—Enzyme activity.*—

| | Enzyme activity, percent | | |
|---|---|---|---|
| | Punch pressure of tablet machine (ton/cm.²) | | |
| Group | 1 | 2 | 3 |
| Control | 80 | 68 | 61 |
| Sample | 92 | 85 | 87 |

*Storage stability.*—The amylase activity of sample (punch pressure: 1 ton/cm.²) after storage for 2 months under the conditions of 50% relative humidity at 40° C., is 90% (control: 60%).

Example 3

(1) *Enzyme.*—An enzyme preparation containing amylase and protease (commercially available as "Biodiastase 100").

(2) *Compressed tablets—Control.*—Tablets [2] formed with enzyme only.

*Sample 1.*—Tablets [1] containing 95% of enzyme preparation (1) and 5% of sorbitol.

*Sample 2.*—Tablets [2] containing 90% of enzyme preparation (1) and 10% of sorbitol.

*Sample 3.*—Tablets [2] containing 80% of enzyme preparation (1) and 20% of sorbitol.

(3) *Methods.*—The same as in Example 1.

(4) *Results.*—

| | Enzyme (amylase) activity, percent | | | |
|---|---|---|---|---|
| | Punch pressure of tablet machine (ton/cm.²) | | | |
| Group | 1 | 2 | 3 | 4 |
| Control | 83 | 87 | 69 | |
| Sample 1 | 92 | 95 | 89 | |
| Sample 2 | | 97 | | 97 |
| Sample 3 | | 106 | | 105 |

Example 4

(1) *Enzyme and methods.*—The same as those in Example 2.

(2) *Compressed tablets—Control.*—Tablets [2] containing 100% of enzyme preparation (1).

*Sample 1.*—Tablets [3] containing 90% of enzyme preparation (1) and 10% of sorbitol.

*Sample 2.*—Tablets [3] containing 70% of enzyme preparation (1), 10% of sorbitol and 20% of magnesium metasilica-alumic acid.

*Sample 3.*—Tablets [2] containing 90% of enzyme preparation (1) and 10% of sorbitol.

*Sample 4.*—Tablets [1] containing 95% of enzyme preparation (1) and 5% of sorbitol.

(3) *Results.*—

| | Enzyme (amylase) activity (percent) | |
|---|---|---|
| | Punch pressure of tablet machine (ton/cm.²) | |
| Group | 2 | 4 |
| Control | 79 | 72 |
| Sample 1 | 97 | 97 |
| Sample 2 | 95 | 95 |
| Sample 3 | 97 | 97 |
| Sample 4 | 93 | 90 |

Example 5

(1) *Enzyme.*—Acid protease preparation obtained according to the method described in Example 3 of United States Pat. No. 3,097,145.

(2) *Tablets—Control.*—Tablets containing 100% of enzyme preparation (1).

*Sample.*—Tablets containing 95% of enzyme preparation (1) and 5% of sorbitol.

---

[1] These are formed in the same manner as in Example 1.
[2] These are formed in the same manner as in Example 1, but the aqueous enzyme solution is made powdery by ethanol precipitation instead of by freeze-drying.
[3] These are formed in the same manner as in Example 1, but the aqueous enzyme solution is made powdery by spray-drying instead of by freeze-drying.

These are formed in the same manner as in Example 1.
(3) *Methods.*—The same as in Example 1.
(4) *Results.*—

| Group | Enzyme (protease) activity (percent) | | |
|---|---|---|---|
| | Punch pressure of tablet machine (ton/cm.²) | | |
| | 1 | 2 | 3 |
| Control | 83 | 59 | 64 |
| Sample | 95 | 107 | 97 |

Example 6

(1) *Enzyme and methods.*—The same as in Example 5.
(2) *Tablets.*—

| Group | Contents, percent | | |
|---|---|---|---|
| | Enzyme | Sorbitol | Magnesium meta-silica alumic acid |
| Control 1 | 100 | | |
| Control 2 | 50 | | 50 |
| Sample 1 | 95 | 5 | |
| Sample 2 | 47.5 | 2.5 | 50 |

These are formed in the same manner as in Example 1, but the aqueous enzyme solution is made powdery by spray-drying instead of by freeze-drying.
(3) *Results.*—

| Group | Enzyme activity, percent | |
|---|---|---|
| | Punch pressure of tablet machine (ton/cm.²) | |
| | 2 | 4 |
| Control 1 | 62.6 | 55.7 |
| Control 2 | 69.9 | 68.8 |
| Sample 1 | 92.4 | 91.2 |
| Sample 2 | 95.2 | 88.8 |

Example 7

(1) *Enzyme and methods.*—The same as in Example 1.
(2) *Tablets.*—

| Group | Contents, percent | | | Drying methods used |
|---|---|---|---|---|
| | Enzyme | Sorbitol | Magnesium metasilica alumic acid | |
| Control | 100 | | | Ethanol precipitation. |
| Sample 1 | 95 | 5 | | Spray drying. |
| Sample 2 | 85 | 5 | 10 | Do. |
| Sample 3 | 95 | 5 | | Freeze-drying. |
| Sample 4 | 90 | 10 | | Ethanol precipitation. |

(3) *Results.—Enzyme activity.*—

| Group | Enzyme activity, percent | |
|---|---|---|
| | Punch pressure of tablet machine (ton/cm.²) | |
| | 2 | 4 |
| Control | 64 | 56 |
| Sample 1 | 95 | 95 |
| Sample 2 | 93 | 92 |
| Sample 3 | 98 | 97 |
| Sample 4 | 98 | 97 |

Storage stability under the conditions of 50% relative humidity at 40° C.:

| Group | Period (days) | |
|---|---|---|
| | 20 | 40 |
| Control | 82 | 50 |
| Sample 1 | 101 | 100 |
| Sample 2 | 94 | 90 |

Example 8

(1) *Enzyme and methods.*—The same as those in Example 1.
(2) *Granules.*—

| Ingredient | Group | |
|---|---|---|
| | Control (weight parts) | Sample (weight parts) |
| Enzyme | 60 | 60 |
| Cellulose powder | 23 | 23 |
| Fructose | 30 | 30 |
| Magnesium meta-silica alumic acid | 30 | 30 |
| Water | 60 | 20 |
| Sorbitol | | 20 |

Enzyme, cellulose powder, fructose and magnesium meta-silica alumic acid are blended, granulated with water (Control) or an aqueous solution of sorbitol (Sample) and dried at 40° C.

(3) *Results.*—

| Group | Enzyme activity, percent | | |
|---|---|---|---|
| | Initial | Granule | After storage for 2 months [1] |
| Control | 100 | 40.2 | 35.0 |
| Sample | 100 | 84.6 | 72.5 |

[1] Under the conditions of 75% relative humidity at 40° C.

Example 9

(1) *Enzymes and methods.*—The same as those in Example 1.
(2) *Pills.*—The granules (wet) prepared in Example 8 are pilled and then dried at 40° C.
(3) *Results.*—

| Group | Enzyme activity, percent | |
|---|---|---|
| | Initial | Pill |
| Control | 100 | 40.0 |
| Sample | 100 | 84.3 |

What is claimed is:

1. A method of preparing a solid enzyme composition of substantially unimpaired enzyme activity which comprises admixing (a) enzyme preparation consisting essentially of enzyme and enzyme carrier and (b) sorbitol, in aqueous medium, the quantity of sorbitol being sufficient to stabilize the mixture against the activity-imparing effects of heat, pressure and water, and converting the resultant aqueous admixture into solid state.

2. The method claimed in claim 1, wherein the sorbitol is in the range of 0.1 to 50 weight percent of the enzyme preparation.

3. The method claimed in claim 1, wherein sorbitol is in the range of 1 to 15 weight percent of the enzyme preparation.

4. The product produced by the method of claim 1.

5. The method of preparing a solid enzyme tablet of substantially unimpaired enzyme activity which comprises admixing (a) enzyme preparation consisting essentially of enzyme and enzyme carrier and (b) sorbitol, in aqueous medium, the quantity of sorbitol being sufficient to stabilize the mixture against the activity-impairing effects of heat, pressure and water, converting the resultant aqueous mixture into a solid state, and pressing the resulting solid mixture under a pressure of at least one ton per square centimeter into tablet form.

6. The product produced by the method of claim 5.

References Cited

UNITED STATES PATENTS

| | | | |
|---|---|---|---|
| 3,072,532 | 1/1963 | Innerfield | 195—63 X |
| 3,344,028 | 9/1967 | Personeus | 424—94 |

LIONEL M. SHAPIRO, Primary Examiner

U.S. Cl. X.R.

195—68; 424—94